United States Patent
Park et al.

(10) Patent No.: US 10,303,223 B2
(45) Date of Patent: May 28, 2019

(54) ELECTRONIC DEVICE INCLUDING HINGE STRUCTURE

(71) Applicant: Samsung Electronics Co., Ltd., Gyeonggi-do (KR)

(72) Inventors: Ji-Sang Park, Gyeonggi-do (KR); Ki-Sung Kim, Gyeonggi-do (KR); Du-Yeong Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/601,304

(22) Filed: May 22, 2017

(65) Prior Publication Data

US 2018/0024596 A1    Jan. 25, 2018

(30) Foreign Application Priority Data

Jul. 21, 2016  (KR) .................. 10-2016-0092837

(51) Int. Cl.
| | | |
|---|---|---|
| *G06F 1/16* | (2006.01) | |
| *H05K 5/00* | (2006.01) | |
| *H05K 7/00* | (2006.01) | |
| *E05D 3/12* | (2006.01) | |
| *F16C 11/04* | (2006.01) | |

(52) U.S. Cl.
CPC .......... *G06F 1/1681* (2013.01); *E05D 3/122* (2013.01); *F16C 11/04* (2013.01); *E05Y 2900/606* (2013.01)

(58) Field of Classification Search
CPC .............................. G06F 1/1681; F16C 11/04

USPC .................. 361/679.26–679.29, 679.55; 455/575.1–575.9
See application file for complete search history.

(56) References Cited

U.S. PATENT DOCUMENTS

| | | | |
|---|---|---|---|
| 6,191,937 B1 * | 2/2001 | Bang | G06F 1/1616 16/354 |
| 9,848,502 B1 * | 12/2017 | Chu | F16C 11/04 |
| 2009/0013500 A1 * | 1/2009 | Ueyama | G06F 1/1616 16/354 |
| 2013/0139355 A1 * | 6/2013 | Lee | H04M 1/022 16/354 |
| 2014/0362507 A1 | 12/2014 | Kinoshita et al. | |
| 2015/0185788 A1 | 7/2015 | Matsuoka | |
| 2015/0212545 A1 | 7/2015 | Ding | |
| 2015/0277505 A1 | 10/2015 | Lim et al. | |
| 2015/0345195 A1 * | 12/2015 | Park | F16C 11/10 16/354 |

(Continued)

FOREIGN PATENT DOCUMENTS

| | | |
|---|---|---|
| JP | 783190 | 9/1995 |
| KR | 100248856 | 3/2000 |

*Primary Examiner* — Anthony M Haughton
(74) *Attorney, Agent, or Firm* — The Farrell Law Firm, P.C.

(57) ABSTRACT

An electronic device is provided which includes a first housing including a first surface and a second surface that faces in a direction opposite or perpendicular to the first surface, a second housing including a third surface that is capable of facing the first surface and a fourth surface that faces in a direction opposite or perpendicular to the third surface, and a hinge structure at least partially inserted into a first recess open on the first surface and a second recess open on the third surface, and couples the first housing and the second housing to be rotatable in relation to each other.

19 Claims, 13 Drawing Sheets

(56) References Cited

U.S. PATENT DOCUMENTS

2015/0362958 A1* 12/2015 Shang .................. G06F 1/1681
361/679.58

* cited by examiner

ELECTRONIC DEVICE INCLUDING HINGE STRUCTURE

PRIORITY

This application claims priority under 35 U.S.C. § 119(a) to Korean Patent Application Serial No. 10-2016-0092837, which was filed in the Korean Intellectual Property Office on Jul. 21, 2016, the entire content of which is incorporated herein by reference.

BACKGROUND

1. Field of the Disclosure

The present disclosure generally relates to an electronic device, and more particularly, to a hinge structure of an electronic device including a plurality of gears.

2. Description of the Related Art

An electronic device refers to a device that performs a specific function according to an equipped program, such as an electronic scheduler, a portable multimedia reproducer, a mobile communication terminal, a tablet PC, an image/sound device, a desktop/laptop computer, or a vehicular navigation system, as well as a home appliance. An electronic device may output information stored therein as sound or an image. As the integration degree of such an electronic device has increased, and high speed and large capacity wireless communication has become popular, various functions have recently been equipped in a single electronic device, such as a mobile communication terminal. For example, various functions, such as an entertainment function (e.g., a game function), a multimedia function (e.g., a music/video reproducing function), a communication and security function for mobile banking, a schedule management function, and an e-wallet function, are integrated in a single electronic device, in addition to a communication function. Such an electronic device has been miniaturized to allow the user to carry it conveniently, and has been designed to meet consumers' needs.

Opening/closing devices of various types are applied to such electronic devices, which may be classified into a hinge type, a sliding type, and a swing type. In particular, a hinge module is one of the most widely used types for electronic devices because it is easy to manufacture, has fewer failures, and is easy to use.

A hinge module used in an existing electronic device is configured to be rotated about the center axis of the hinge module in order to connect the display unit and the system unit to each other. Further, the hinge module is cut on the outer surface in order to avoid a rotational interference during each additional rotation of the electronic device, and the shape of the hinge module is exposed from the outside.

The existing hinge module structure has a cut-out shape on the outer surface of the electronic device, so that the outer shape of the hinge module is limited and seen to be functional, which is not good for the beauty of the product and makes a grip feeling poor when gripping the electronic device that is generally made to be portable.

SUMMARY

An aspect of the present disclosure provides an electronic device including a hinge structure in which the hinge structure is disposed on an inner surface of the electronic device so that no cut-out shape exists on an outer surface of the electronic device unlike the prior art, thereby enabling the expression of a simple and clean external design and being helpful for a grip feeling when carrying the electronic device.

Another aspect of the present disclosure provides an electronic device including a hinge structure in which a plurality of gears are rotated to be interlocked with each other so that a user can be satisfied with a smooth rotation when opening and closing the electronic device. According to an aspect of the present disclosure, an electronic device is provided which includes a first housing including a first surface and a second surface that faces in a direction opposite or perpendicular to the first surface, a second housing including a third surface that is capable of facing the first surface and a fourth surface that faces in a direction opposite or perpendicular to the third surface, and a hinge structure at least partially inserted into a first recess open on the first surface and a second recess open on the third surface, and couples the first housing and the second housing to be rotatable in relation to each other.

According to another aspect of the present disclosure, a hinge structure is provided which includes a first gear that rotates in a first recess of a first housing, a second gear that rotates in a direction different from a rotating direction of the first gear in a second recess of the second housing, and a plurality of link gears that are rotatable when engaged with the first gear or the second gear, and are accommodated in or away from the first recess or the second recess according to the rotation direction.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
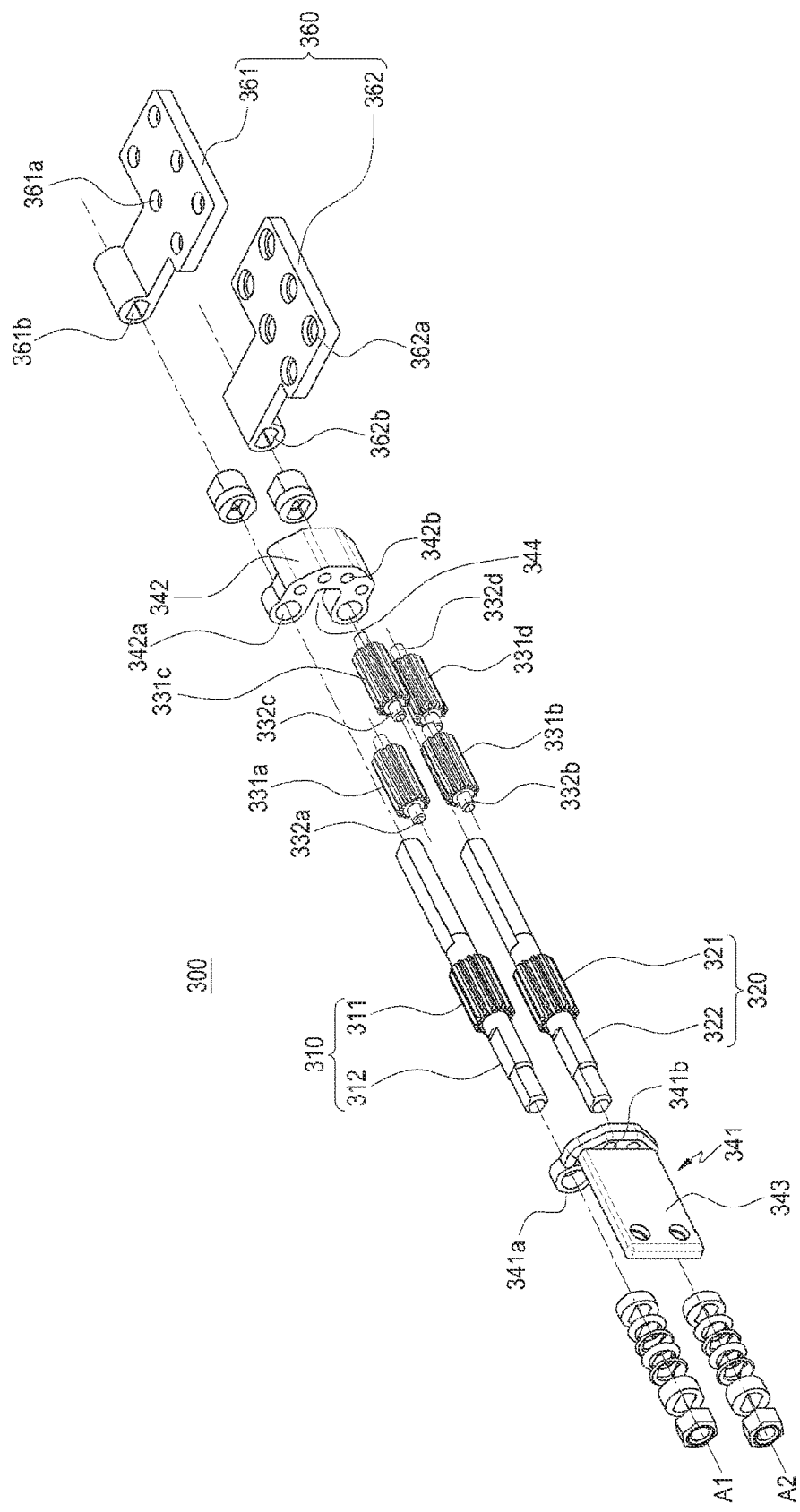
FIG. 1 is an exploded perspective view illustrating individual components of a hinge structure in an electronic device according to an embodiment of the present disclosure.

Hereinafter, various embodiments of the present disclosure will be described with reference to the accompanying drawings. The embodiments and the terms used herein do not limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are different in context. As used herein, singular forms may include plural forms as well unless the context clearly indicates otherwise. The expressions "a first", "a second", "the first", or "the second" as used in various embodiments of the present disclosure may modify various components regardless of the order and/or the importance but do not limit the corresponding components. When an element (e.g., first element) is referred to as being "(functionally or communicatively) connected," or "directly coupled" to another element (e.g., second element), the element may be connected directly to the another element or connected to the other element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that may perform the corresponding operations by executing one or more software programs stored in a memory device.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller machine (ATM), point of sales (POS) terminal, or Internet of things (IoT) device (e.g., a light bulb, various sensors, electric or gas meter, a sprinkler device, a fire alarm, a thermostat, a streetlamp, a toaster, a sporting good, a hot water tank, a heater, a boiler, etc.).

An electronic device may include at least one of a part of furniture or a building/structure, an electronic board, an electronic signature receiving device, a projector, and various types of measuring instruments (e.g., a water meter, an electric meter, a gas meter, a radio wave meter, and the like). The electronic device may be flexible, or may be a combination of one or more of the aforementioned various devices. The electronic device is not limited to the above described devices. In the present disclosure, the term "user" may indicate a person using an electronic device or a device (e.g., an artificial intelligence electronic device) using an electronic device.

FIG. 1 is an exploded perspective view illustrating individual components of a hinge structure 300 in an electronic device according to one embodiment of the present disclosure.

Figure 2A:
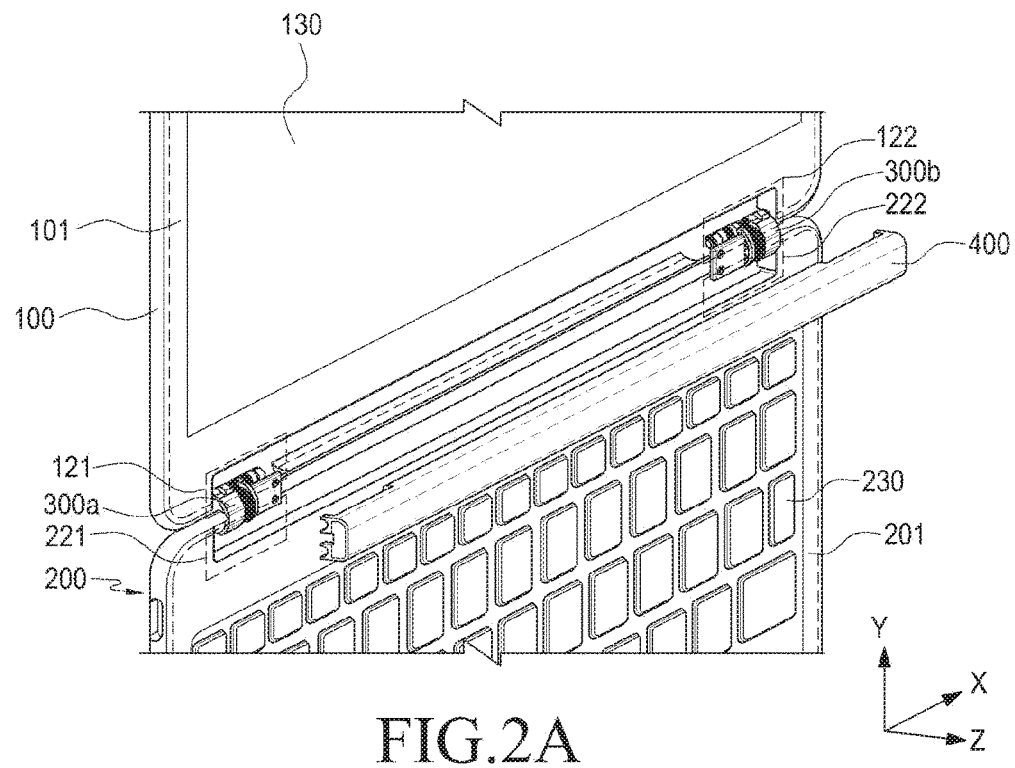
FIG. 2A is a perspective view illustrating a hinge structure mounted in an electronic device according to an embodiment of the present disclosure.

FIG. 2A is a perspective view illustrating the hinge structure 300 mounted in the electronic device 10 according to an embodiment of the present disclosure.

Figure 2B:
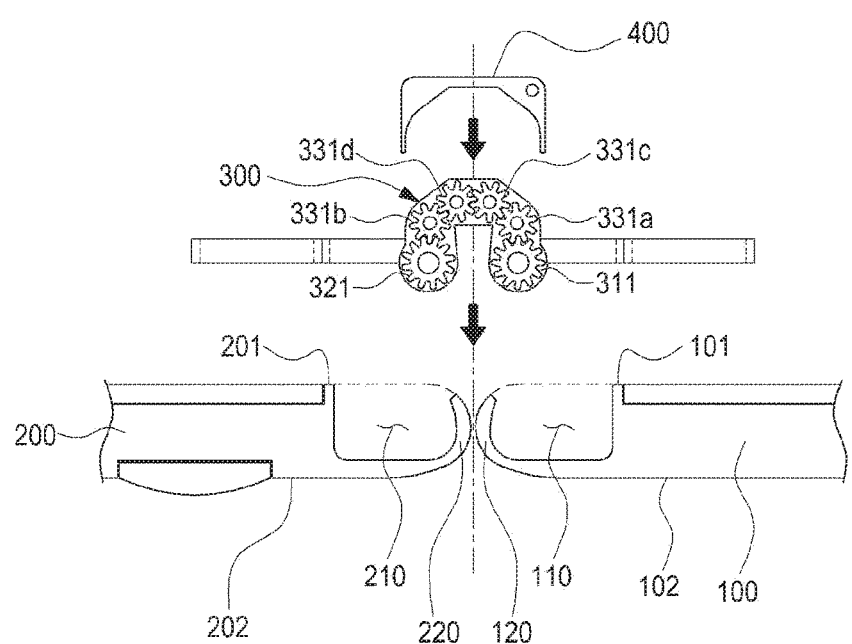
FIG. 2B is a cross-sectional view illustrating a process of assembling an electronic device and a hinge structure according to an embodiment of the present disclosure.

FIG. 2B is a cross-sectional view illustrating a process of assembling the electronic device 10 and the hinge structure 300 with each other, according to an embodiment of the present disclosure.

In FIG. 2A, an "X-axis" in an orthogonal coordinate system of three axes may correspond to the longitudinal direction of the electronic device 10, a "Y-axis" may correspond to the width direction of the electronic device 10, and a "Z-axis" may correspond to the thickness direction of the electronic device 10. In an embodiment of the present disclosure, the "X-axis direction" may refer to a first direction (+X, −X), and the "Y-axis direction" may refer to a second direction (+Y, −Y), and the "Z-axis direction" may refer to a third direction (+Z, −Z).

As illustrated in FIGS. 1 and 2, the electronic device 10 includes a first housing 100, a second housing 200, and a hinge structure 300 that rotatably couples the first housing 100 and the second housing 200 to each other.

The first housing 100 or the second housing 200 may include a data input unit, a data output unit, and/or a data input/output unit on an inner surface thereof. For example, as the data input unit 230, an input device, such as a keypad, may be used, as the data output unit 130, a display unit, such as a display device, may be used, and a device, such as a touch screen, may be used as the data input/output unit.

The first housing 100 may include a first surface 101 facing in a third direction (+Z) and a second surface 102 facing in an opposite direction (−Z) to the first surface 101 or in a vertical direction (+X, −X). For example, when a user uses the electronic device 10, the surface viewed by the user may be the first surface 101 of the first housing 100 and the rear and side surfaces covering the first housing 100 may be the second surface 102.

According to various embodiments, the second housing 200 may include a third surface 201 facing in the third direction (+Z) and a fourth surface 202 facing in the opposite direction (−Z) to the third surface 201 or in a vertical direction (+X, −X). For example, when the user uses the electronic device 10, the surface on which data is input may be the third surface 201 of the second housing 200, and the rear and side surfaces covering the second housing 200 may be the fourth surface 202.

According to an embodiment of the present disclosure, the first and second housings 100 and 200 may include at least one recess in the inside thereof such that at least a portion of the hinge structure 300 may be seated therein to be connected.

According to an embodiment of the present disclosure, the hinge structure 300 is arranged in a state of being at least partially inserted into a first recess 110 that is open on the first surface 101 and a second recess 210 that is open on the third surface 201, and the first housing 100 and the second housing 200 may be rotatably coupled to each other.

According to an embodiment of the present disclosure, the hinge structure 300 may include a first hinge structure 300a and a second hinge structure 300b that are provided at the opposite ends of the first housing 100 and the second housing 200, respectively. For example, the first housing 100 may include a first side portion 121 and a second side portion 122 that are opposed to each other with respect to the center of an edge portion 120, and the second housing 200 may include a third side portion 221 and a fourth side portion 222 disposed opposite to each other with respect to the center of an edge portion 220. The first hinge structure 300a may be disposed to be connected to the first side portion 121 and the third side portion 221 and the second hinge structure 300b may be disposed to be connected to the second side portion 122 and the fourth side portion 222.

Hereinafter, the first hinge structure 300a and the second hinge structure 300b are configured to have the same structure and the same operation in a state where the first hinge structure 300a and the second hinge structure 300b are opposed to each other, and thus descriptions will be made with reference to only one hinge structure.

According to an embodiment of the present disclosure, the hinge structure 300 may include a first connection bracket 361, a second connection bracket 362, a support bracket 340, a first gear 311, a second gear 321, and a plurality of link gears 331.

According to an embodiment of the present disclosure, the first connection bracket 361 may include at least one first coupling hole 361a to be coupled with the first housing 100 so that the first connection bracket 361 may be coupled to the first housing 100 by a bolt. Screw threads may be formed on the inner surface of the first coupling hole 361a, and the first connection bracket 361 may be coupled to the first housing 100 by a bolt. In addition, at least one second coupling hole corresponding to the first coupling hole 361a may be formed in the first housing 100, and as the bolt is inserted into the first coupling hole 361a and the second coupling hole, the first connection bracket 361 may be coupled with the first housing 100.

According to an embodiment of the present disclosure, the first connection bracket 361 may be formed with a third coupling hole 361b into which a first gear shaft 312 of the first gear 311 is inserted. The first gear shaft 312 may have a polygonal shape or a cylindrical shape, and the third coupling hole 361b may have a shape corresponding to that of the first gear shaft 312. When the first gear shaft 312 is inserted into and coupled to the third coupling hole 361b, the first gear 311 may be rotated together with the first connection bracket 361.

According to an embodiment of the present disclosure, the second connection bracket 362 may include at least one fourth coupling hole 362a to be coupled with the second housing 200 so that the second connection bracket 362 may be coupled to the second housing 200 by a bolt. Screw threads may be formed on the inner surface of the fourth coupling hole 362a, and the second connection bracket 362 may be coupled to the second housing 200 by a bolt. In addition, at least one fifth coupling hole corresponding to the fourth coupling hole 362a may be formed in the second housing 200, and as the bolt is inserted into the fourth coupling hole 362a and the fifth coupling hole, the second connection bracket 362 may be coupled with the second housing 200.

According to an embodiment of the present disclosure, the second connection bracket 362 may be formed with a sixth coupling hole 362b into which a second gear shaft 322 of the second gear 321 is inserted. The second gear shaft 322 may have a polygonal shape or a cylindrical shape, and the sixth coupling hole 362b may have a shape corresponding to that of the second gear shaft 322. When the second gear shaft 322 is inserted into and coupled to the sixth coupling hole 362b, the second gear 321 may be rotated together with the second connection bracket 362.

According to an embodiment of the present disclosure, the support brackets 341 and 342 may include a first bracket 341 and a second support bracket 342 that rotatably support the first gear 311, the second gear 321, and a plurality of link gears 331a, 331b, 331c and 331d.

According to an embodiment of the present disclosure, the first support bracket 341 may be formed with a plurality of support holes 341a and 341b, into which one end of the first and second gear shafts 312 and 322 and one end of the link gear shafts 332a, 332b, 332c and 332d formed in the plurality of link gears 331a, 331b, 331c and 331d are inserted, respectively. The first support bracket 341 may rotate together with the first and second gear shafts 312 and 322 while supporting the first and second gear shafts 312 and 322 that pass through the first support hole 341a, and may rotate while supporting the link gear shafts 332a, 332b, 332c and 332d that pass through the second support holes 341b. The first support bracket 341 may include a support plate 343 that protects the coupling with accessory parts that support and fix the first and second gear shafts 312 and 322 and is coupled with a hinge cover described below.

According to an embodiment of the present disclosure, the second support bracket 342 may be formed with a plurality of support holes 342a and 342b, into which the other end of the first and second gear shafts 312 and 322 and the other end of the link gear shafts 332a, 332b, 332c and 332d formed in the plurality of link gears 331a, 331b, 331c and 331d are inserted, respectively. The second support bracket 342 may rotate together with the first and second gear shafts 312 and 322 while supporting the first and second gear shafts 312 and 322 that penetrate the first support holes 342a, and may rotate while supporting the link gear shafts 332a, 332b, 332c and 332d that penetrate the second support holes 342b.

According to an embodiment of the present disclosure, the first support bracket 341 and/or the second support bracket 342 may be configured to include a groove shape of which one side is open in correspondence with the arrangement direction of the plurality of link gears 332a, 332b, 332c and 332d. For example, the open groove 344 may be in a "⊏" shape. The edge portion 120 of the first housing 100 and the edge portion 220 of the second housing 200 may be partially inserted into the open groove 344 of the support brackets 341 and 342 so that the first housing 100 and the second housing 200 may be connected to each other.

According to an embodiment of the present disclosure, the hinge structure 300 of the electronic device 10 may further include accessory parts, such as an elastic member that presses the first support bracket 341, washers that are in contact with one surface of the elastic member, and nuts that fix the first and second gear shafts 312 and 322 that penetrate the first support hole 341a. For example, one or more elastic members may be disposed on one surface of the support plate 343, and the first and second gear shafts 312 and 322 may penetrate the elastic members such that the elastic members face the first and second gears 311 and 321 across the first support holes 341a. The elastic members may be constructed as a dish shaped spring. As another example, at least one of the washers may be disposed on one surface of the support plate 343, and the first and second gear shafts 312 and 322 may penetrate the washers such that the washers face the first and second gears 311 and 321 across the first support holes 341a. Nuts may be coupled to the ends of the first and second gear shafts 312 and 322 to fix other accessory parts. Screw threads may be formed at the other ends of the first and second gear shafts 312 and 322, and the nuts may be fastened on the screw threads so as to press the first support bracket 341. The accessory parts may fix the hinge structure 300 as a whole and may adjust the torque.

According to an embodiment of the present disclosure, the first gear 311 may be coupled to the first gear shaft 312 and may be rotated to a state of being seated in the first recess 110 of the first housing 100. The second gear 321 may be coupled to the second gear shaft 322 and may be rotated to a state of being seated in the second recess 210 of the second housing 200. In addition, the plurality of link gears 331a, 331b, 331c, and 331d may be arranged in the first surface 101 direction (+Z) of the first housing 100 or in the second surface 201 direction (+Z) of the second housing 200 and may be rotated when engaged with the first gear 311 or the second gear 321.

Detailed descriptions of the first gear 311, the second gear 312, and the plurality of link gears 331a, 331b, 331c, and 331d will be described later.

Figure 3A:
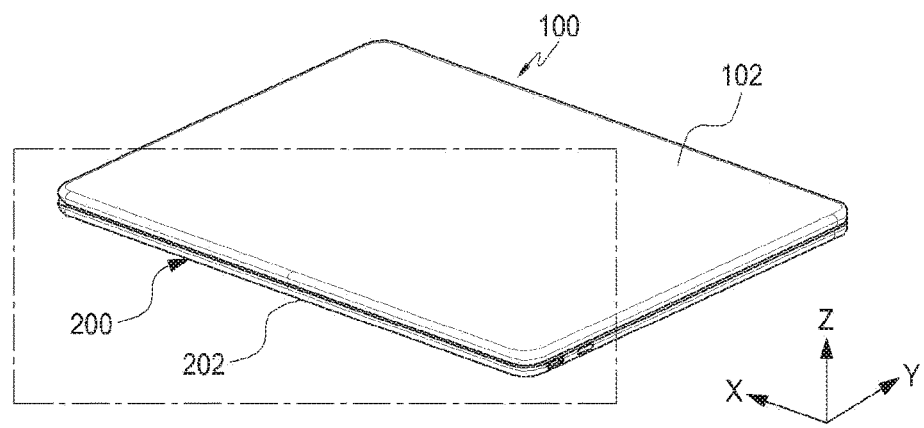
FIG. 3A is a perspective view illustrating the electronic device in a first operation, according to an embodiment of the present disclosure.

FIG. 3A is a perspective view illustrating the electronic device 10 in a first operation according to an embodiment of the present disclosure.

Figure 3B:
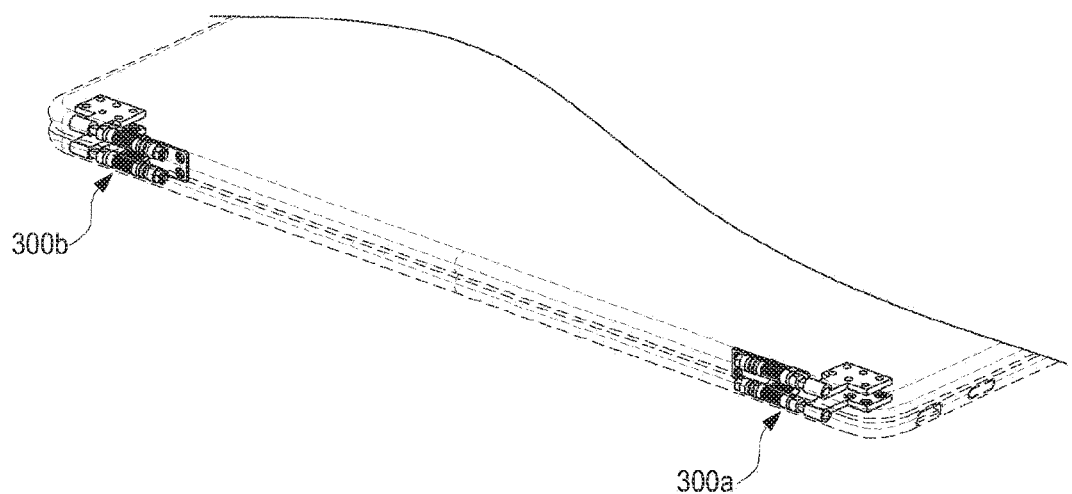
FIG. 3B is a projection view illustrating hinge structures disposed in an electronic device according to an embodiment of the present disclosure.

FIG. 3B is a projection view illustrating the hinge structures 300 disposed in the electronic device 10 according to an embodiment of the present disclosure.

Figure 4:
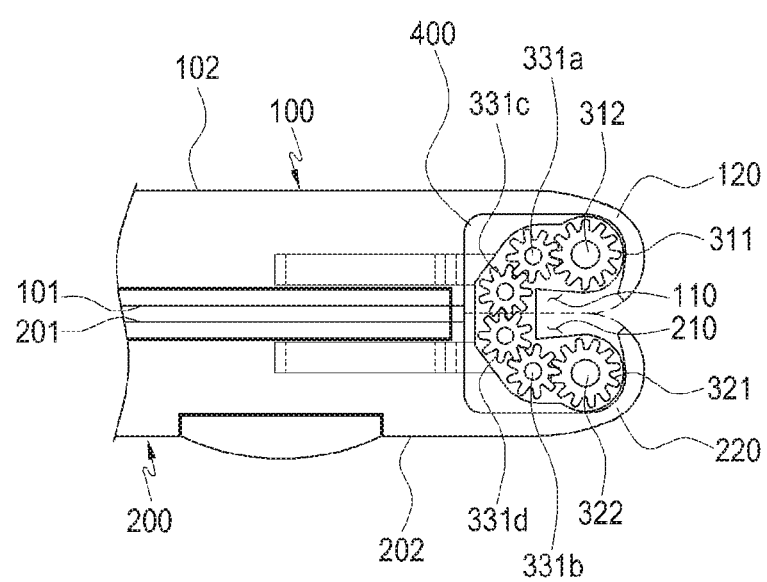
FIG. 4 is a cross-sectional view illustrating a hinge structure in the electronic device of FIGS. 3A and 3B according to an embodiment of the present disclosure.

FIG. 4 is a cross-sectional view illustrating the hinge structure 300 in the electronic device 10 of FIGS. 3A and 3B according to an embodiment of the present disclosure.

Figure 5A:
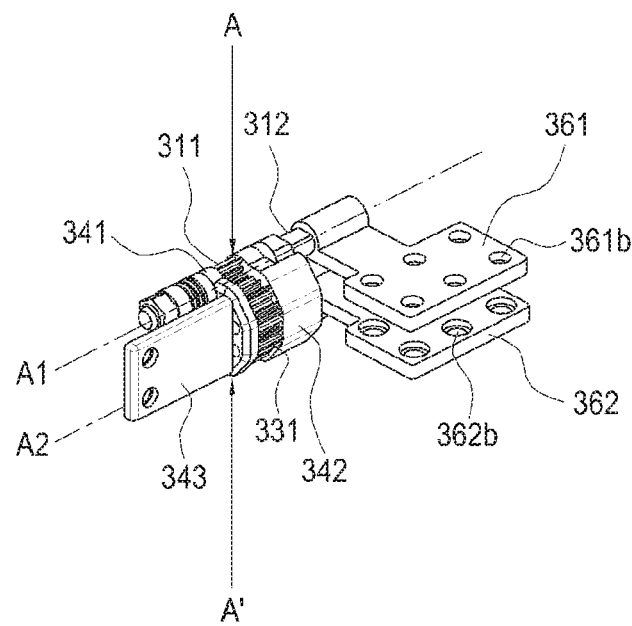
FIG. 5A is a perspective view illustrating a hinge structure in a first operation, according to an embodiment of the present disclosure.

FIG. 5A is a perspective view illustrating the hinge structure 300 according to an embodiment of the present disclosure.

Figure 5B:
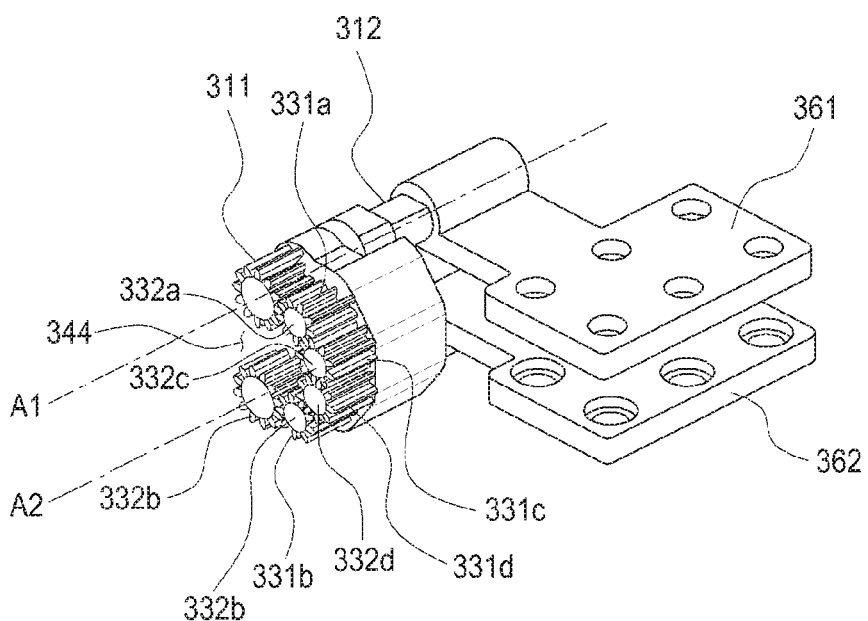
FIG. 5B is a perspective view illustrating a cross section of a hinge structure cut in a direction A-A' according to an embodiment of the present disclosure.

FIG. 5B is a perspective view illustrating a cross section of the hinge structure 300 cut in a direction A-A' according to an embodiment of the present disclosure.

In the electronic device 10 according to an embodiment of the present disclosure, the first gear shaft 312 of the first hinge structure 300a and the first gear shaft 312 of the second hinge structure 300b may form a first imaginary axis A1, and the first housing 100 may rotate about the first imaginary axis A1 while having the first imaginary axis A1. In addition, the second gear shaft 322 of the first hinge structure 300a and the second gear shaft 322 of the second hinge structure 300b may form a second imaginary axis A2, and the second housing 200 may rotate about the second imaginary axis A2 while having the second imaginary axis A2.

As the first housing 100 and the second housing 200 rotate about different hinge axes (e.g., the first imaginary axis A1 and the second imaginary axis A2), the second housing 200 may rotate between 0 and 180 degrees with respect to the first housing 100. The angle of 0 to 180 degrees may be defined as the angle of the second housing 200 with respect to the first housing 100. In the present disclosure, descriptions will be made by defining an operation in which the angle between the first housing 100 and the second housing 200 is 0 degrees as a first operation, an operation in which the angle between the first housing 100 and the second housing 200 exceeds 0 degrees and is less than 180 degrees as a second operation, and an operation in which the angle between the first housing 100 and the second housing 200 is 180 degrees as a third operation.

For example, the operations in FIGS. 3 to 5 may be defined as the first operation. As illustrated in FIGS. 3A and 3B, FIG. 4, and FIGS. 5A and 5B, the angle between the first housing 100 and the second housing 200 is 0 degrees, and hence the angle between the first connection bracket 361 of the hinge structure 300 and the second connection bracket 362 is 0 degrees.

In FIG. 3A, an "X-axis" in an orthogonal coordinate system of three axes may correspond to the longitudinal direction of the electronic device 10, a "Y-axis" may correspond to the width direction of the electronic device 10, and a "Z-axis" may correspond to the thickness direction of the electronic device 10. In addition, in an embodiment of the present disclosure, the "X-axis direction" may refer to a first direction (+X, −X), and the "Y-axis direction" may refer to a second direction (+Y, −Y), and the "Z-axis direction" may refer to a third direction (+Z, −Z).

According to an embodiment of the present disclosure, the first housing 100 may accommodate various electronic components and the like, and a display device 130 exposed in the front direction may be disposed at the center of the first surface 101. The display device 130 may occupy most of the first surface 101 of the first housing 100. The upper end region of the first surface 101 of the first housing 100 may include a camera, an illuminance sensor, or a proximity sensor. In addition, a cover for protecting electronic components, such as the display device 130, may be disposed on a rear surface and/or a side surface which correspond to the second surface 102 of the first housing 100 (see FIG. 2A).

According to an embodiment of the present disclosure, the display device 130 may be made of a material that at least partially transmits radio waves or magnetic fields. For example, the display device 130 may include a window member made of tempered glass and a display mounted on the inner surface of the window member. A touch panel may be mounted between the window member and the display. For example, the display device 130 may be an output device for outputting a screen, and may be used as an input device equipped with a touch screen function.

According to an embodiment of the present disclosure, the second housing 200 may accommodate various electronic components and the like, and a keypad 230 exposed in the front direction may be disposed at the center of the third surface 201. The second housing 200 may include at least one printed circuit board, a battery, and the like therein. For example, a processor, a communication module, various interfaces, a power management module, and the like may be mounted on the printed circuit board in the form of integrated circuit chips, and a control circuit may also be configured as an integrated circuit chip to be mounted on the printed circuit board. In addition, a cover for protecting electronic components, such as the keypad and the printed circuit board, may be disposed on a rear surface and/or a side surface, which correspond to the fourth surface 202 of the second housing 200.

According to an embodiment of the present disclosure, in the first operation, the first surface 101 of the first housing 100 and the third surface 201 of the second housing 200 may be disposed to face each other, and the second surface 102 of the first housing 100 and the fourth surface 202 of the second housing 200 may be disposed to be opposite to each other. For example, the first surface 101 of the first housing 100 may be disposed to face in the third direction (−Z), and the third surface 201 of the second housing 200 may be disposed to face in the third direction (+Z). In addition, the second surface 102 of the first housing 100 may be disposed to face in the third direction (+Z), and the fourth surface 202 of the second housing 200 may be disposed to face in the third direction (−Z). Accordingly, the user cannot see the first surface 101 and the third surface 201, and may see only the second surface 102 and the fourth surface 202 that correspond to the outer covers.

According to an embodiment of the present disclosure, the electronic device 10 may include a first recess 110 at one end of the first edge portion 120 at one side of the first surface 101 of the first housing 100 so as to provide a space in which the hinge structure 300 is mounted on a portion of the first housing 100 and the second housing 200 to be driven. In addition, the third surface 201 of the second housing 200 may include a second recess 210 at one end of the second edge portion 220. In the state of rotating 0 degrees (first operation), the first recess 110 and the second recess 210 may face each other at the open sides thereof so as to form one space, and the entire hinge structure 300 may be disposed to be seated in the one space.

According to an embodiment of the present disclosure, since the hinge structure 300 is seated in the first and second recesses 110 and 210 of the first surface 101 and the third surface 201 of the first housing 100 and the second housing 200, the hinge structure 300 is invisible when the first housing 100 and the second housing 200 are viewed from the outside. Thus, a device of the present disclosure may form a clean and attractive appearance without a fitting line as a whole, and the user may have an interference-free grip feeling when carrying the electronic device.

According to an embodiment of the present disclosure, in the first operation, the first connection bracket 361 may be disposed in a direction parallel to the first surface 101 within the first housing 100, and the second connection bracket 362 may be disposed in a direction parallel to the second surface 201 within the second housing 200. The first connection bracket 361 and the second connection bracket 362 may be disposed to face each other.

According to an embodiment of the present disclosure, in the first operation, the support brackets 341, 342 may be disposed such that the open groove 344 faces in the second direction (+Y), and the first edge portion 120 and the second edge portion 220 may be inserted into and disposed on the inside of the open groove 344. The support plate 343 may be disposed to face in a direction (second direction (+Y)) perpendicular to one surface of the first connection bracket 361 and/or one surface of the second connection bracket 362. A hinge cover 400 may be installed to face the support plate 343.

According to an embodiment of the present disclosure, the first side portion 121 of the first housing 100 is coupled with the first connection bracket 361 so that the first housing 100 may be rotated together with the first connection bracket 361, and the second side portion 221 of the second housing 200 is coupled with the second connection bracket 362 so that the second housing 200 may be rotated together with the second connection bracket 362 (see FIG. 2A). As described above, the first connection bracket 361 is sequentially connected to the first gear 311, the plurality of link gears 331a, 331b, 331c, and 331d and the second gear 321 so that the first connection bracket 361 may be rotated in the same direction as the second connection bracket 362.

According to an embodiment of the present disclosure, the first gear 311 and the second gear 321 are arranged such that the first gear shaft 312 and the second gear shaft 322 penetrate the first gear 311 and the second gear 321, respectively. The first gear 311 and the second gear 321 may be rotated when engaged with some of the plurality of link gears 331a, 331b, 331c and 331d.

According to an embodiment of the present disclosure, the first gear 311 may be fixed and disposed at the edge of the first recess 110 of the first housing 100. The center of the first gear 311 may form a part of the first gear shaft 312 and the first imaginary axis A1. The second gear 321 may be fixed and disposed at the edge of the second recess 210 of the second housing 200. The center of the second gear 321 may form a part of the second gear shaft 322 and the second imaginary axis A2, and the second gear 321 may rotate in a direction different from that of the first gear 311. In the first operation, the first imaginary axis A1 and the second imaginary axis A2 may be arranged in parallel, and the first and second imaginary axes A1 and A2 may be disposed on the upper side and the lower side with reference to the Z axis, respectively.

According to an embodiment of the present disclosure, the first gear 311 and the second gear 321 may be configured to have the same diameter as each other, and to have the same number of gear teeth. The diameters of the first gear 311 and the second gear 321 shall not be greater than the thickness "D2" of the first housing 100 or the second housing 200, and may increase in proportion to the entire thickness "D3" of the first housing 100 and the second housing 200 (see FIG. 13).

According to an embodiment of the present disclosure, the plurality of link gears 331a, 331b, 331c and 331d may be arranged between the first gear shaft 312 and the second gear shaft 322, and some of the plurality of link gears 331a, 331b, 331c and 331d may be rotated when engaged with the first gear 311 of the first gear shaft 312 or the second gear 321 of the second gear shaft 322.

According to an embodiment of the present disclosure, the number of link gears 331 may be an even number. For example, the link gears 331 may include a first link gear 331a, a second link gear 331b, a third link gear 331c and a fourth link gear 331d, which are rotatable when engaged with each other. The first link gear 331a is rotatable when engaged with the first gear 311, and may be rotated in a direction that is different from that of the first gear 311. The second link gear 331b is rotatable when engaged with the second gear 321, and may be rotated in a direction that is different from that of the second gear 321. The first link gear 331a and the second link gear 331b may have the same diameter, and may be disposed to face each other. The third link gear 331c is rotatable when engaged with the first link gear 331a, and may be rotated in the same direction as the first gear 311 or the second link gear 331b. The fourth link gear 331d is rotatable when engaged with the second link gear 331b and the third link gear 331c, and may be rotated in the same direction as the second gear 321 or the first link gear 331a. The third link gear 331c and the fourth link gear 331d may have the same diameter, and may be disposed to face each other. Therefore, the first link gear 331a, the third link gear 331c, the fourth link gear 331d, the second link gear 331b, and the second gear 321 may be arranged to be rotated by being sequentially engaged with each other with reference to the first gear 311.

According to an embodiment of the present disclosure, the first gear 311 and the second gear 321 may be rotated in the state being fixed to the first housing 100 and the second housing 200, respectively, and the plurality of link gears 331a, 331b, 331c and 331d may be rotated while being moved from the inside to the outside of the first housing 100 or the second housing 200 according to the operation of the hinge structure 300 (when proceeding from the first operation to the third operation).

According to an embodiment of the present disclosure, the plurality of link gears 331a, 331b, 331c and 331d are disposed between a first support bracket 341 and a second support bracket 342, each of the first support bracket 341 and the second support bracket 342 may be formed with four support holes, into which the ends of the first link gear shaft 332a of the first link gear 331a, the second link gear shaft 332b of the second link gear 331b, the third link gear shaft 332c of the third link gear 331c, and the fourth link gear shaft 332d of the fourth link gear 331d may be inserted, respectively. The four second support holes 341b of the first support bracket 341 and the four second support holes 342b of the second support bracket 342 may be located on the same line.

According to an embodiment of the present disclosure, the plurality of link gears 331a, 331b, 331c and 331d may have a relatively smaller diameter than the first gear 311 and the second gear 321. The plurality of link gears 331a, 331b, 331c, and 331d may have the same diameter.

According to an embodiment of the present disclosure, in the case where the first housing 100 and the second housing 200 of the electronic device 10 face each other (first operation), among the plurality of link gears 331, the first link gear 331a may be seated in the first recess 110 of the first housing 100 and the second link gear 331b may be seated in the second recess 210 of the second housing 200.

According to an embodiment of the present disclosure, in the case where the first housing 100 and the second housing 200 of the electronic device 10 face each other (first operation), among the plurality of link gears 331, the third link gear 331a may be at least partially seated in the first recess 110 of the first housing 100, and the fourth link gear 331d may be at least partially seated in the second recess 210 of the second housing 200.

According to an embodiment of the present disclosure, the first link gear 331a and the fourth link gear 331d may rotate and operate in the same direction as the second gear 321. The second link gear 331b and the third link gear 331c rotate in the same direction as the first gear 311, which is the opposite direction to the second gear 321.

According to an embodiment of the present disclosure, the plurality of link gears 331a, 331b, 331c and 331d may be configured to have the same radius, and the same number of gear teeth. The diameter of each of the plurality of link gears 331a, 331b, 331c and 331d shall not be greater than the thickness "D2" of the first housing 100 or the second housing 200, and may increase in proportion to the entire thickness "D3" of the first housing 100 and the second housing 200 (see FIGS. 13A to 13C). As another example, the number of the link gears 331a, 331b, 331c and 331d may be increased in proportion to the distance D1 between the hinge axes and the size of the first and second gears 311 and 321, and the arrangement angle of the plurality of link gears 331a, 331b, 331c and 331d may vary by avoiding interference with the first housing 100 and the second housing 200 when the third operation is performed from the first operation.

According to an embodiment of the present disclosure, the first gear 311, the second gear 321, and the plurality of link gears 331a, 331b, 331c and 331d may be arranged in the form of a "⊏" shape. The centers of the first gear 311 and the second gear 321 may be arranged on the same line, and some of the plurality of link gears 331a, 331b, 331c and 331d may be arranged such that the centers thereof are paired on the same line. For example, the centers of the first link gear 331a and the second link gear 331b may be arranged on the same line, and the centers of the third link gear 331c and the fourth link gear 331d may be arranged in the same line. However, the arrangement of the first gear 311, the second gear 321, and the plurality of link gears 331a, 331b, 331c and 331d is not limited to the "⊏" shape, and may be configured in various arrangements as long as the gears may be smoothly rotated when engaged with each other.

According to an embodiment of the present disclosure, in the first operation, the arrangement of the gears may be disposed such that the groove open at one side faces in the second direction (+Y), the arrangement of which corresponds to the shape of the support brackets 341 and 342.

According to an embodiment of the present disclosure, a hinge cover 400 may be disposed above the hinge structure 300. When the angle of the second housing 200 with respect to the first housing 100 is 0 degrees (first operation), the hinge cover 400 is disposed on the upper side of the first and second recesses 110 and 210. The hinge cover 400 is provided in a shape corresponding to one surface of the plurality of link gears 331a, 331b, 331c and 331d so as to cover the exposed surfaces of the plurality of link gears 331a, 331b, 331c and 331d.

According to an embodiment of the present disclosure, in the first operation, the hinge cover 400 may be disposed such that the front surface thereof faces in the second direction (+Y), and the inner surface of the hinge cover 400 may correspond to the shape of the support brackets 341 and 342.

Figure 6A:
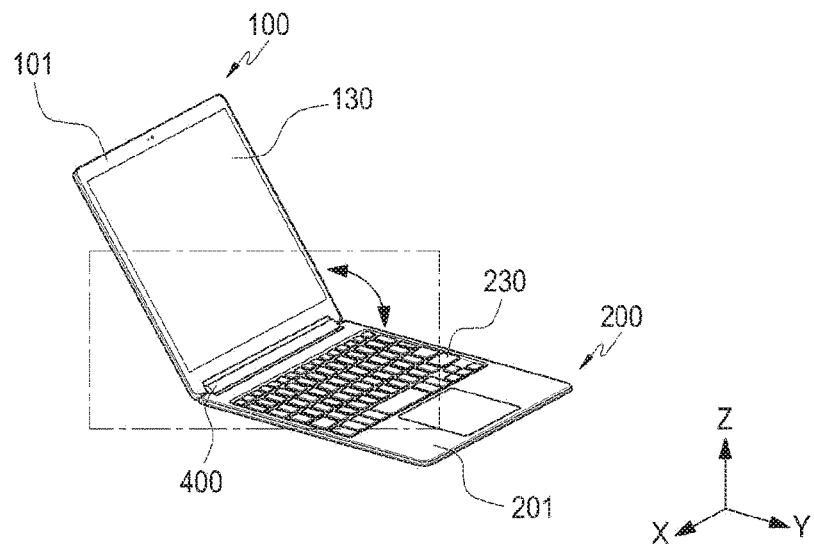
FIG. 6A is a perspective view illustrating an electronic device in a second operation, according to an embodiment of the present disclosure.

FIG. 6A is a perspective view illustrating the electronic device 10 in a second operation according to an embodiment of the present disclosure.

Figure 6B:
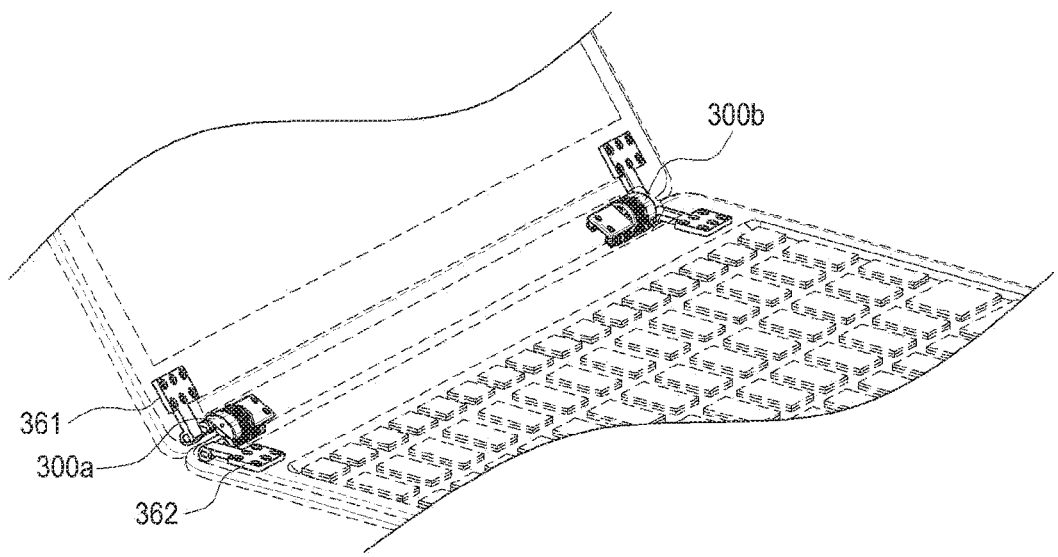
FIG. 6B is a projection view illustrating a hinge structure disposed in an electronic device according to an embodiment of the present disclosure.

FIG. 6B is a projection view illustrating the hinge structures 300 disposed in the electronic device 10 in a second operation according to an embodiment of the present disclosure.

Figure 7:
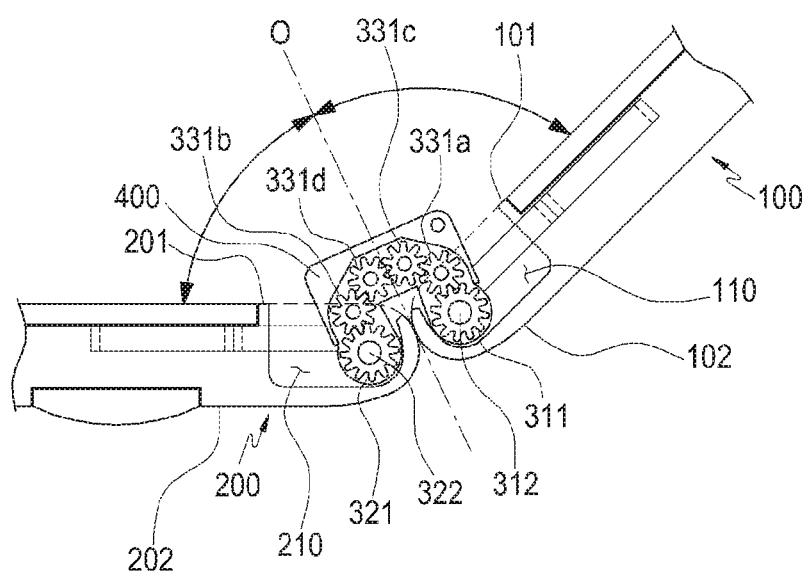
FIG. 7 is a cross-sectional view illustrating the hinge structure in the electronic device of FIGS. 6A and 6B according to an embodiment of the present disclosure.

FIG. 7 is a cross-sectional view illustrating the hinge structure 300 in the electronic device 10 of FIGS. 6A and 6B according to an embodiment of the present disclosure.

Figure 8A:
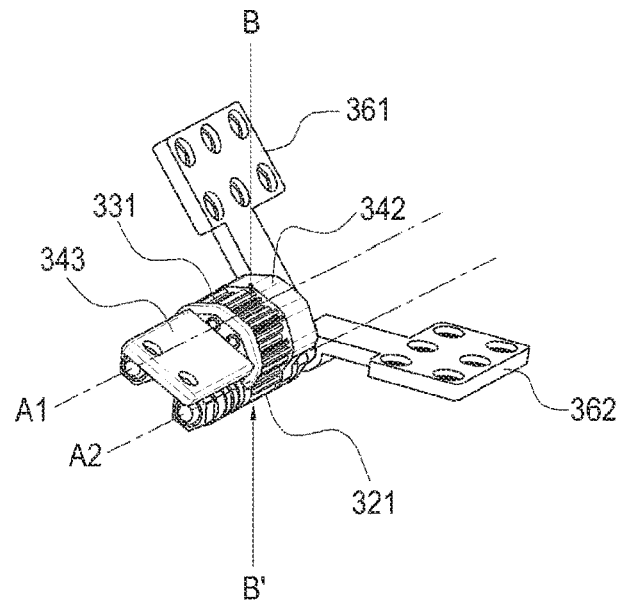
FIG. 8A is a perspective view illustrating a hinge structure in a second operation, according to an embodiment of the present disclosure.

FIG. 8A is a perspective view illustrating the hinge structure 300 according to an embodiment of the present disclosure.

Figure 8B:
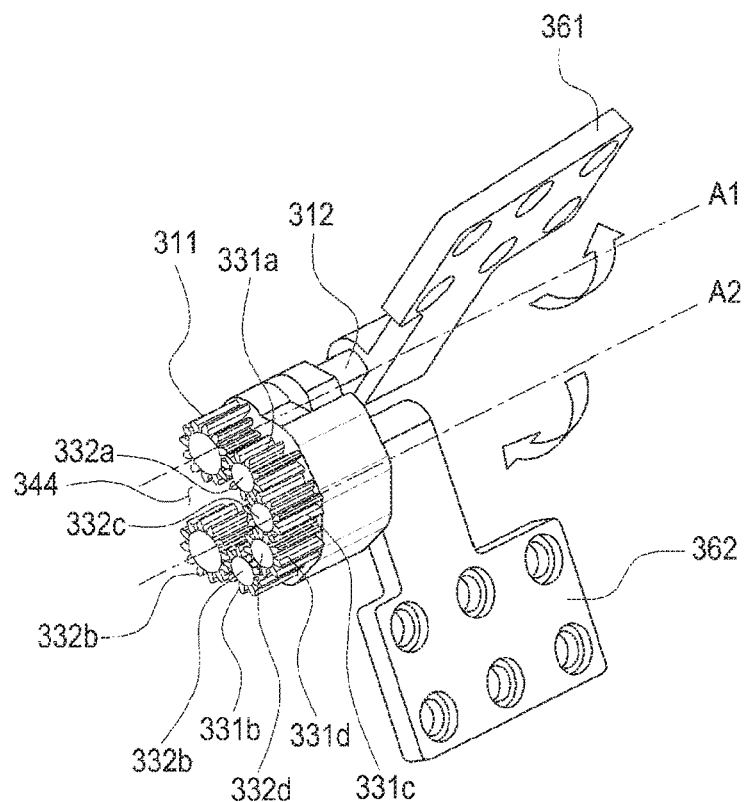
FIG. 8B is a perspective view illustrating a cross section of the hinge structure cut in a direction B-B' according to an embodiment of the present disclosure.

FIG. 8B is a perspective view illustrating a cross section of the hinge structure 300 cut in a direction B-B' according to an embodiment of the present disclosure.

The operation in FIGS. 6A and 6B, FIG. 7, and FIGS. 8A and 8B may be defined as the second operation. As illustrated in FIGS. 6A and 6B, FIG. 7, and FIGS. 8A and 8B, the angle between the first housing 100 and the second housing 200 exhibits a range that is greater than 0 degrees and less than 180 degrees, and the angle between the first connection bracket 361 of the hinge structure 300 and the second connection bracket 362 exhibits a range that is greater than 0 degrees and less than 180 degrees.

In FIG. 6A, an "X-axis" in an orthogonal coordinate system of three axes may correspond to the longitudinal direction of the electronic device 10, a "Y-axis" may correspond to the width direction of the electronic device 10, and a "Z-axis" may correspond to the thickness direction of the electronic device 10. In addition, in one embodiment of the present disclosure, the "X-axis direction" may refer to a first direction (+X, -X), and the "Y-axis direction" may refer to a second direction (+Y, -Y), and the "Z-axis direction" may refer to a third direction (+Z, -Z).

According to an embodiment of the present disclosure, the angle of the first housing 100 with respect to the second housing 200 may be about 135 degrees. The user may use the electronic device 10 in the second operation. For example, in the second operation, the second housing 200 of the electronic device 10 may be configured such that, for example, an application for document preparation may be executed in the state where the second housing 200 of the electronic device 10 is placed on the user's knee, a desk, and the like, and the first housing 100 is a display device, such as a display, and may be implemented as an input device according to the operation of the second housing 200.

Hereinafter, the description related to the first housing 100 and the second housing 200 described with reference to FIGS. 3A and 3B, FIG. 4 and FIGS. 5A and 5B may be similarly applied to FIGS. 6A and 6B, FIG. 7, and FIGS. 8A and 8B.

According to an embodiment of the present disclosure, in the second operation, the first surface 101 of the first housing 100 and the third surface 201 of the second housing 200 may be disposed to form a predetermined angle (greater than 0 degrees and less than 180 degrees) therebetween, and the second surface 102 of the first housing 100 and the fourth surface 202 of the second housing 200 may be disposed to form a predetermined angle (greater than 0 degrees and less than 180 degrees) therebetween. For example, the third surface 201 of the second housing 200 may be disposed to face in the third direction (+Z), and the first surface 101 of the first housing 100 may be disposed to have an angle of about 135 degrees with reference to third surface 201. As one example, in the second operation, when the angle between the first housing 100 and the second housing 200 is maintained at 90 degrees, the first surface 101 of the first housing 100 may be disposed to face in the second direction (+Y). In addition, the fourth surface 202 of the second housing 200 may be disposed to face in the third direction (-Z), and the second surface 102 of the first housing 100 may be disposed to have an angle of about 135 degrees with reference to third surface 201. As another example, in the second operation, when the angle between the first housing 100 and the second housing 200 is maintained at 90 degrees, the second surface 102 of the first housing 100 may be disposed to face in the second direction (-Y).

According to an embodiment of the present disclosure, the electronic device 10 may include a first recess 110 at one end of the first edge portion 120 at one side of the first surface 101 of the first housing 100 so as to provide a space in which the hinge structure 300 is mounted on a portion of the first housing 100 and the second housing 200 to be driven. In addition, the third surface 201 of the second housing 200 may include a second recess 210 at one end of the second edge portion 220. The first recess 110 and the second recess 210 may be disposed such that the open sides thereof face a predetermined angle in the second operation, and the hinge structure 300 may be disposed to protrude in an upper space in addition to the first and second recesses 110 and 210.

According to an embodiment of the present disclosure, since the hinge structure 300 is disposed in the first and second recesses 110 and 210 of the first and third surfaces 101 and 201 of the first and second housings 100 and 200 and the protrusion space on the first and second recesses 110 and 210, the hinge structure 300 is invisible when viewing the first housing 100 and the second housing 200 from the rear surface (the second surface and the fourth surface). Thus, a device of the present disclosure may form a clean and attractive appearance without a fitting line. In addition, when the user is using the electronic device, a clean and attractive appearance may be formed due to the hinge cover.

According to an embodiment of the present disclosure, in the second operation, the first connection bracket 361 may be disposed in a direction parallel to the first surface 101 within the first housing 100, and the second connection bracket 362 may be disposed in a direction parallel to the second surface 201 within the second housing 200. Accordingly, one surface of the second connection bracket 362 may be disposed to face the third direction (+Z, -Z), and one surface of the first connection bracket 361 may be disposed to have an angle of about 135 degrees with reference to the second connection bracket 362.

According to an embodiment of the present disclosure, in the second operation, the support brackets 341, 342 may be disposed such that the open groove 344 faces in a direction corresponding to the inclination of the first housing, and may be rotated in the state where the first edge portion 120 and the second edge portion 220 are inserted into and disposed in the inside of the open groove 344. The support plate 343 may be disposed to face an angle (fourth direction (+O)) corresponding to half of the angle formed by one surface of the first connection bracket 361 and one surface of the second connection bracket 362. A hinge cover 400 may be installed to face the support plate 343.

Hereinafter, the contents related to the first gear 331, the second gear 332, and the plurality of link gears 331a, 331b, 331c and 331d described with reference to FIGS. 3A and 3B, FIG. 4 and FIGS. 5A and 5B may be similarly applied to FIGS. 6A and 6B, FIG. 7, and FIGS. 8A and 8B.

According to an embodiment of the present disclosure, the first gear 311 may be fixed and disposed at the edge of the first recess 110 of the first housing 100. The center of the first gear 311 may form a part of the first gear shaft 312 and the first imaginary axis A1. The second gear 321 may be fixed and disposed at the edge of the second recess 210 of the second housing 200. The center of the second gear 321 may form a part of the second gear shaft 322 and the second imaginary axis A2, and the second gear 321 may rotate in a direction different from that of the first gear 311. In the first operation, the first imaginary axis A1 and the second imaginary axis A2 may be arranged in parallel, and the first and second imaginary axes A1 and A2 may be disposed on the upper side and the lower side with reference to the Z axis, respectively, in the state where the first housing 100 forms a predetermined angle with respect to the second housing 200.

According to an embodiment of the present disclosure, the first gear 311 and the second gear 321 may be rotated to the state being fixed to the first housing 100 and the second housing 200, respectively, and the plurality of link gears 331a, 331b, 331c and 331d may be rotated while being moved from the inside to the outside of the first housing 100 or the second housing 200 according to the operation of the hinge structure 300 (when proceeding from the first operation to the third operation).

According to an embodiment of the present disclosure, in the second operation, among the plurality of link gears 331, the first link gear 331a may be at least partially seated in the first recess 110 of the first housing 100, and the second link gear 331b may be at least partially seated in the second recess 210 of the second housing 200.

According to an embodiment of the present disclosure, in the second operation, among the plurality of link gears 331, the third link gear 331c may be at least partially seated in the first recess 110 of the first housing 100, and the fourth link gear 331d may be at least partially seated in the second recess 210 of the second housing 200. As another example, as the angle of the second operation increases, the third link gear 331c and/or the fourth link gear 331d may move out of the first recess 110 and/or the second recess 210 to be disposed in the upper space of the first recess 110 and/or the second recess 210. The third link gear 331c and/or the fourth link gear 331d may be rotated in a state of protruding from the first surface 101 and/or the third surface 201.

According to an embodiment of the present disclosure, the first gear 311, the second gear 321, and the plurality of link gears 331a, 331b, 331c and 331d may be arranged in the form of a " ⌐ " shape. The centers of the first gear 311 and the second gear 321 may be arranged on the same line, and some of the plurality of link gears 331a, 331b, 331c and 331d may be arranged such that the centers thereof are paired on the same line. For example, the centers of the first link gear 331a and the second link gear 331b may be arranged on the same line, and the centers of the third link gear 331c and the fourth link gear 331d may be arranged on the same line.

According to an embodiment of the present disclosure, in the second operation, the arrangement of the gears may be disposed such that the groove open at one side faces in the fourth direction (−O), the arrangement of which corresponds to the shape of the support brackets 341 and 342.

According to an embodiment of the present disclosure, a hinge cover 400 may be disposed above the hinge structure 300. When the angle of the second housing 200 with respect to the first housing 100 is greater than 0 degrees and less than 180 degrees (second operation), the hinge cover 400 may be disposed on the upper side of the first and second recesses 110 and 210 while being rotated. The hinge cover 400 is provided in a shape corresponding to one surface of the plurality of link gears 331a, 331b, 331c and 331d so as to cover the exposed surfaces of the plurality of link gears 331a, 331b, 331c and 331d.

According to an embodiment of the present disclosure, in the second operation, the hinge cover 400 may be disposed such that the front surface thereof faces in the fourth direction (+O), and the inner surface of the hinge cover 400 may correspond to the shape of the support brackets 341 and 342.

Figure 9A:
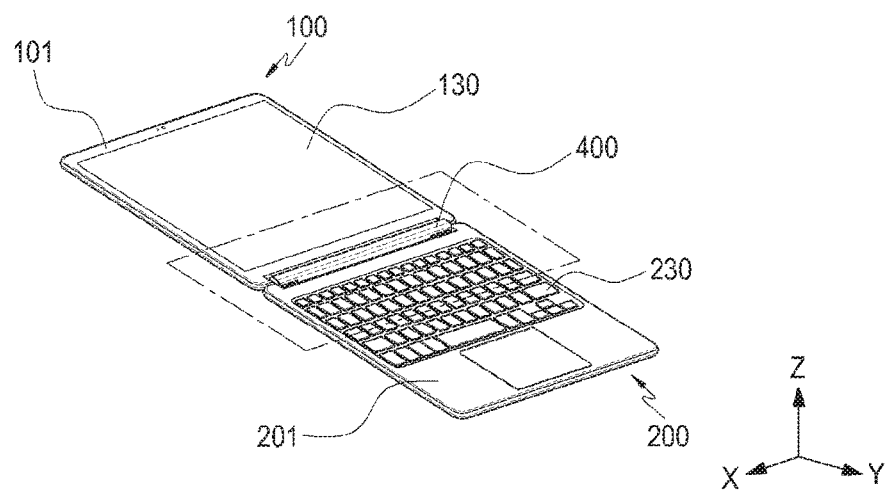
FIG. 9A is a perspective view illustrating an electronic device in a third operation, according to an embodiment of the present disclosure.

FIG. 9A is a perspective view illustrating the electronic device 10 in a third operation according to an embodiment of the present disclosure.

Figure 9B:
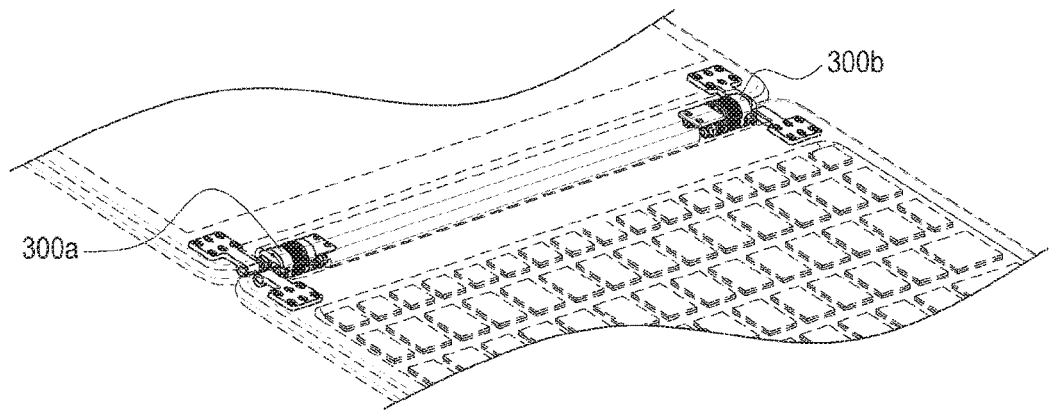
FIG. 9B is a projection view illustrating a hinge structure disposed in an electronic device according to an embodiment of the present disclosure.

FIG. 9B is a projection view illustrating the hinge structure 300 disposed in the electronic device 10 according to an embodiment of the present disclosure.

Figure 10:
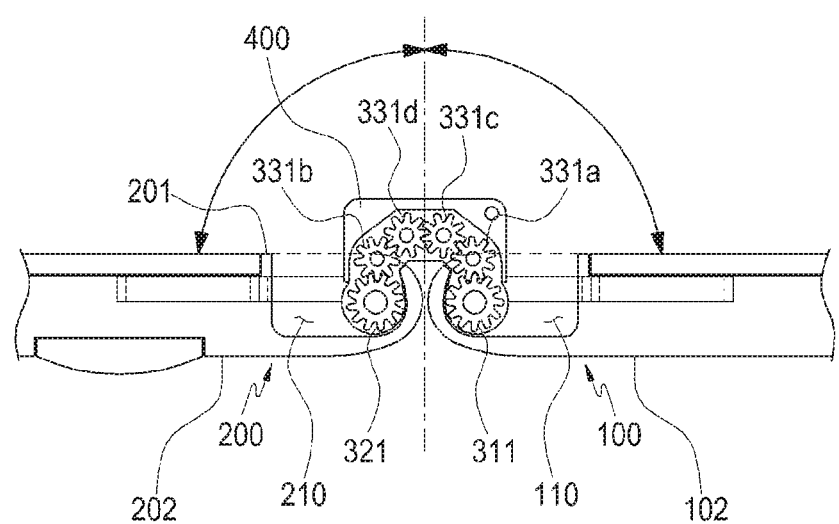
FIG. 10 is a cross-sectional view illustrating the hinge structure in the electronic device of FIGS. 9A and 9B according to an embodiment of the present disclosure.

FIG. 10 is a cross-sectional view illustrating the hinge structure 300 in the electronic device 10 of FIGS. 9A and 9B according to an embodiment of the present disclosure.

Figure 11A:
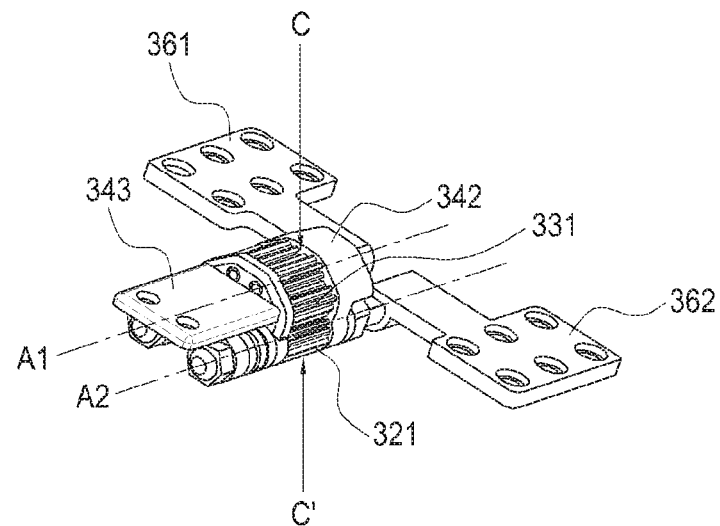
FIG. 11A is a perspective view illustrating a hinge structure in a third operation, according to an embodiment of the present disclosure.

FIG. 11A is a perspective view illustrating the hinge structure 300 in a third operation according to an embodiment of the present disclosure.

Figure 11B:
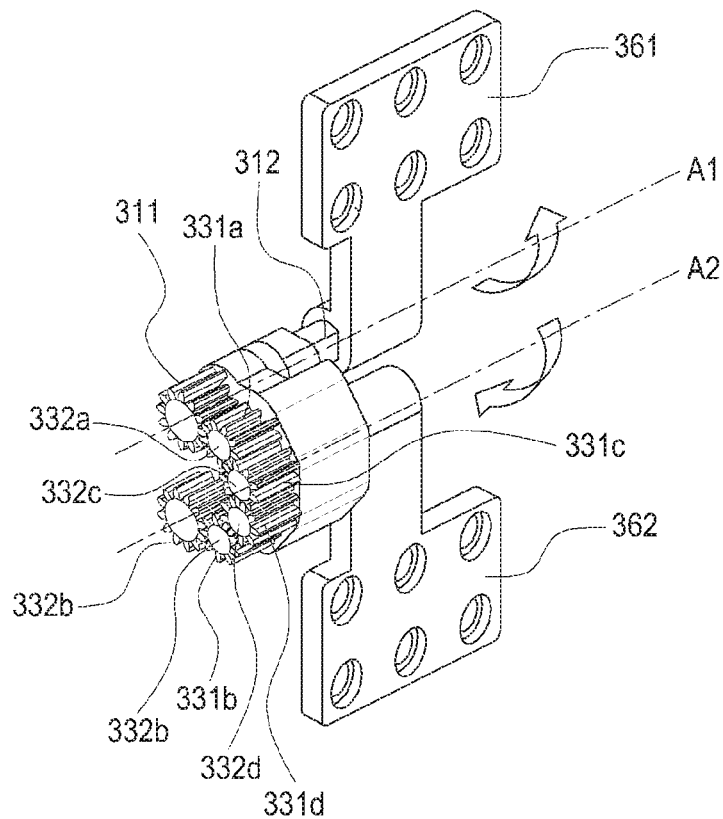
FIG. 11B is a perspective view illustrating a cross section of the hinge structure cut in a direction C-C' according to an embodiment of the present disclosure.

FIG. 11B is a perspective view illustrating a cross section of the hinge structure 300 cut in a direction C-C' according to an embodiment of the present disclosure.

The operation in FIGS. 9A and 9B, FIG. 10, and FIGS. 11A and 11B may be defined as the third operation. As illustrated in FIGS. 9A and 9B, FIG. 10, and FIGS. 11A and 11B, the angle between the first housing 100 and the second housing 200 is 180 degrees, and hence the angle between the first connection bracket 361 of the hinge structure 300 and the second connection bracket 362 is 180 degrees.

In FIG. 9A, an "X-axis" in an orthogonal coordinate system of three axes may correspond to the longitudinal direction of the electronic device 10, a "Y-axis" may correspond to the width direction of the electronic device 10, and a "Z-axis" may correspond to the thickness direction of the electronic device 10. In addition, in an embodiment of the present disclosure, the "X-axis direction" may be refer to a first direction (+X, −X), and the "Y-axis direction" may be refer to a second direction (+Y, −Y), and the "Z-axis direction" may be refer to a third direction (+Z, −Z).

The user may use the electronic device 10 in the third operation. For example, in the third operation, the second housing 200 of the electronic device 10 may be configured such that, for example, an application for document preparation may be executed in the state where the second housing 200 of the electronic device 10 is placed on a desk, and the like, and the first housing 100 is a display device, such as a display, and may be implemented as an input device according to the driving of the second housing 200.

Hereinafter, the contents related to the first housing 100 and the second housing 200 described with reference to FIGS. 3A and 3B, FIG. 4 and FIGS. 5A and 5B may be similarly applied to FIGS. 9A and 9B, FIG. 10, and FIGS. 11A and 11B.

According to an embodiment of the present disclosure, in the third operation, the first surface 101 of the first housing 100 and the third surface 201 of the second housing 200 may be disposed in parallel while facing in the same direction, and the second surface 102 of the first housing 100 and the fourth surface 202 of the second housing 200 may also be disposed in parallel while facing in the same direction (to be opposite to the first surface 101 and the third surface 201). For example, the first surface 101 of the first housing 100 may be disposed to face in the third direction (+Z), and the third surface 201 of the second housing 200 may be disposed to face in the third direction (+Z). In addition, the second surface 102 of the first housing 100 may be disposed to face in the third direction (−Z), and the fourth surface 202 of the second housing 200 may be disposed to face in the third direction (−Z).

According to an embodiment of the present disclosure, the electronic device 10 may include a first recess 110 at one end of the first edge portion 120 at one side of the first surface 101 of the first housing 100 so as to provide a space in which the hinge structure 300 is mounted on a portion of the first housing 100 and the second housing 200 to be driven. In addition, the third surface 201 of the second housing 200 may include a second recess 210 at one end of the second edge portion 220. The first recess 110 and the second recess 210 may be disposed such that the open sides thereof are disposed in parallel while facing the upper side in the third operation, and the hinge structure 300 may be disposed to protrude in an upper space in addition to the first and second recesses 110 and 210.

According to an embodiment of the present disclosure, since the hinge structure 300 is disposed in the first and second recesses 110 and 210 of the first and third surfaces 101 and 201 of the first and second housings 100 and 200 and the protrusion space on the first and second recesses 110 and 210, the hinge structure 300 is invisible when viewing the first housing 100 and the second housing 200 from the rear surface (the second surface and the fourth surface). Thus, a device of the present disclosure may form a clean and attractive appearance without a fitting line. In addition, when the user is using the electronic device 10, a clean and attractive appearance may be formed due to the hinge cover 400.

According to an embodiment of the present disclosure, in the third operation, the first connection bracket 361 may be disposed in a direction parallel to the first surface 101 within the first housing 100, and the second connection bracket 362 may be disposed in a direction parallel to the second surface 201 within the second housing 200. Accordingly, one surface of the first connection bracket 361 and one surface of the second connection bracket 362 may be disposed to face in the third direction (+Z, −Z).

According to an embodiment of the present disclosure, in the third operation, the support brackets 341, 342 may be disposed such that the open groove 344 faces in the third direction (+Z), and the first edge portion 120 and the second edge portion 220 may be inserted into and disposed on the inside of the open groove 344. The support plate 343 may be disposed to face in the same direction (third direction (+Z)) as one surface of the first connection bracket 361 and/or one surface of the second connection bracket 362. A hinge cover 400 may be installed to face the support plate 343.

Hereinafter, the contents related to the first gear 331, the second gear 332, and the plurality of link gears 331a, 331b, 331c and 331d described with reference to FIGS. 3A and 3B, FIG. 4 and FIGS. 5A and 5B may be similarly applied to FIGS. 9A and 9B, FIG. 10, and FIGS. 11A and 11B.

According to an embodiment of the present disclosure, the first gear 311 may be fixed and disposed at the edge of the first recess 110 of the first housing 100. The center of the first gear 311 may form a part of the first gear shaft 312 and the first imaginary axis A1. The second gear 321 may be fixed and disposed at the edge of the second recess 210 of the second housing 200. The center of the second gear 321 may form a part of the second gear shaft 322 and the second imaginary axis A2, and the second gear 321 may rotate in a direction different from that of the first gear 311. In the third operation, the first imaginary axis A1 and the second imaginary axis A2 may be arranged in parallel, and the first and second imaginary axes A1 and A2 may be disposed on the left side and the right side, respectively, in the state where the first housing 100 forms an angle of 180 degrees with respect to the second housing 200.

According to an embodiment of the present disclosure, the first gear 311 and the second gear 321 may be rotated in the state being fixed to the first housing 100 and the second housing 200, respectively, and the plurality of link gears 331a, 331b, 331c and 331d may be rotated while being moved from the inside to the outside of the first housing 100 or the second housing 200 according to the operation of the hinge structure 300 (when proceeding from the first operation to the third operation).

According to an embodiment of the present disclosure, in the third operation, among the plurality of link gears 331, the first link gear 331a may be at least partially seated in the first recess 110 of the first housing 100, and the second link gear 331b may be at least partially seated in the second recess 210 of the second housing 200. The remaining portion of the first link gear 331a may be disposed in the state of protruding from the first surface 101, and the remaining portion of the second link gear 331b may be disposed in the state of protruding from the third surface 201.

According to an embodiment of the present disclosure, in the third operation, among the plurality of link gears 331, the third link gear 331c may be disposed in the state of protruding to the upper side of the first recess 110 of the first housing 100, and the fourth link gear 331d may be disposed in the state of protruding to the upper side of the second recess 210 of the second housing 200.

According to an embodiment of the present disclosure, the first gear 311, the second gear 321, and the plurality of link gears 331a, 331b, 331c and 331d may be arranged in the form of a "⌊" shape. The centers of the first gear 311 and the second gear 321 may be arranged on the same line, and some of the plurality of link gears 331a, 331b, 331c and 331d may be arranged such that the centers thereof are paired on the same line. For example, the centers of the first link gear 331a and the second link gear 331b may be arranged on the same line, and the centers of the third link gear 331c and the fourth link gear 331d may be arranged on the same line.

According to an embodiment of the present disclosure, in the third operation, the arrangement of the gears may be disposed such that the groove open at one side faces in the third direction (−Z), the arrangement of which corresponds to the shape of the support brackets 341 and 342.

According to an embodiment of the present disclosure, a hinge cover 400 may be disposed above the hinge structure 300. When the angle of the second housing 200 with respect to the first housing 100 is 180 degrees (third operation), the hinge cover 400 is disposed on the upper side of the first and second recesses 110 and 210. The hinge cover 400 is provided in a shape corresponding to one surface of the plurality of link gears 331a, 331b, 331c and 331d so as to cover the exposed surfaces of the plurality of link gears 331a, 331b, 331c and 331d.

According to an embodiment of the present disclosure, in the second operation, the hinge cover 400 may be disposed such that the front surface thereof faces in the third direction (+Z), and the inner surface of the hinge cover 400 may correspond to the shape of the support brackets 341 and 342.

Figure 12A:
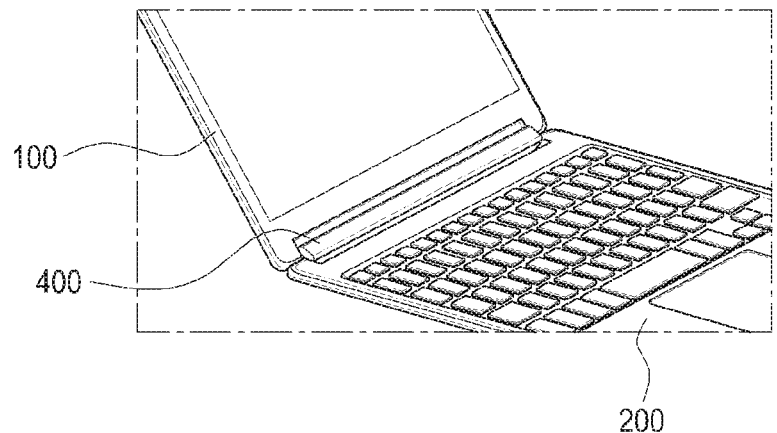
FIGS. 12A and 12B are perspective views illustrating a hinge cover arranged in an electronic device according to an embodiment of the present disclosure.
Figure 12B:
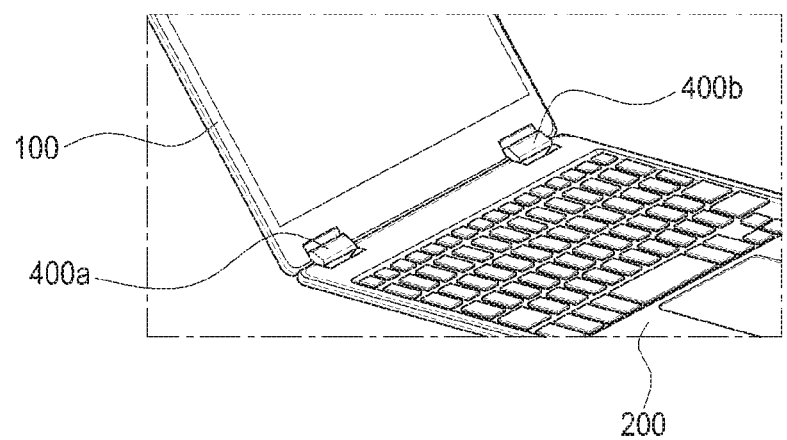

FIGS. 12A and 12B are perspective views illustrating the hinge cover 400 arranged on the electronic device 10 according to an embodiment of the present disclosure.

As illustrated in FIG. 1, FIGS. 2A and 2B, and FIGS. 12A and 12B, the hinge cover 400 may be disposed to enclose the outer surfaces of one or more link gears 331a, 331b, 331c and 331d and the first and second support brackets 341 and 342 disposed in the first housing 100 and the second housing 200, 331d, and is rotatable in response to the rotation of the one or more link gears 331a, 331b, 331c and 331d.

According to an embodiment of the present disclosure, the hinge cover 400 may include one or more coupling holes to be fastened to the support plate 343 so that the hinge cover 400 may be coupled with the support plate 343 by bolts. Screw threads may be formed on the inner surfaces of the coupling holes, and the hinge cover 400 may be coupled with the support plate 343 by the bolts. In addition, one or more other coupling holes corresponding to the coupling holes may be formed in the support plate 343, and the bolts may be inserted into the coupling holes and the other coupling holes so that the hinge cover 400 may be coupled with the support plate 343.

According to an embodiment of the present disclosure, the inner surface of the hinge cover 400 may have a "⊏" shape which is the same shape as the outer shapes of the first and second support brackets 341 and 342, and the outer surface of the hinge cover 400 may have a shape of covering the entire hinge structure 300 so as not to be seen from the outside.

According to an embodiment of the present disclosure, the hinge cover 400 may have a length that is capable of covering the first hinge structure 300a and the second hinge structure 300b as a whole. For example, the hinge cover may have a length to cover the edge portions 120 and 220 of the first and second housings 100 and 200 as a whole, in addition to the first recess 110 and the second recess 210 in which the first hinge structure 300a and the second hinge structure 300b are disposed.

According to an embodiment of the present disclosure, the hinge cover 400 may have a length that is capable of individually covering the first hinge structure 300a or the second hinge structure 300b. For example, the hinge cover 400 may include a first hinge cover 400a configured in a shape that corresponds to the first hinge structure 300a and the first and second recesses 110 and 210 in which the first hinge structure 300a is disposed, and a second hinge cover 400b configured in a shape that corresponds to the second hinge structure 300 and the first and second recesses 110 and 210 in which the second hinge structure 300b is disposed.

According to an embodiment of the present disclosure, since the hinge cover 400 covers the recesses 110 of the first surface 101 and the third surface 201 of the first housing 100 and the second housing 200, the hinge structure 300 is invisible even when viewing the first surface 101 and the third surface 201 of the first housing 100 and the second housing 200 in the second and third operations. Thus, a device of the present disclosure may form a clean and attractive appearance.

Figure 13A:
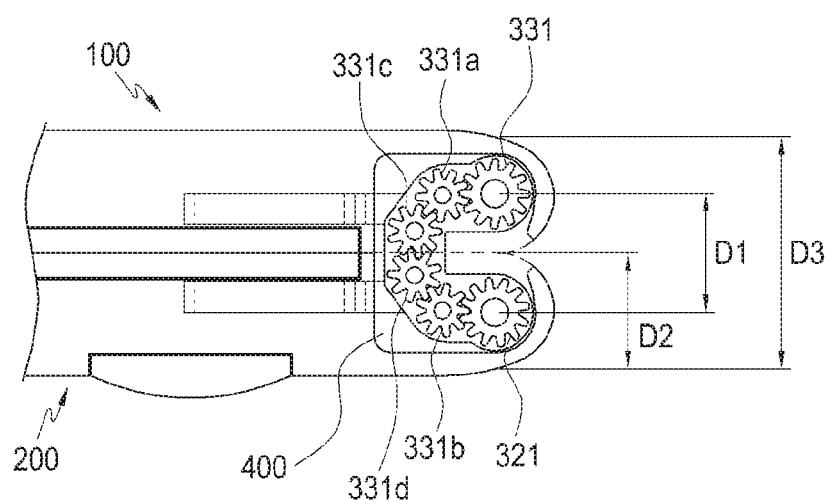
FIGS. 13A to 13C are cross-sectional views of a hinge structure in an electronic device in order to illustrate an arrangement of link gears, according to an embodiment of the present disclosure.
Figures 13B, 13C:
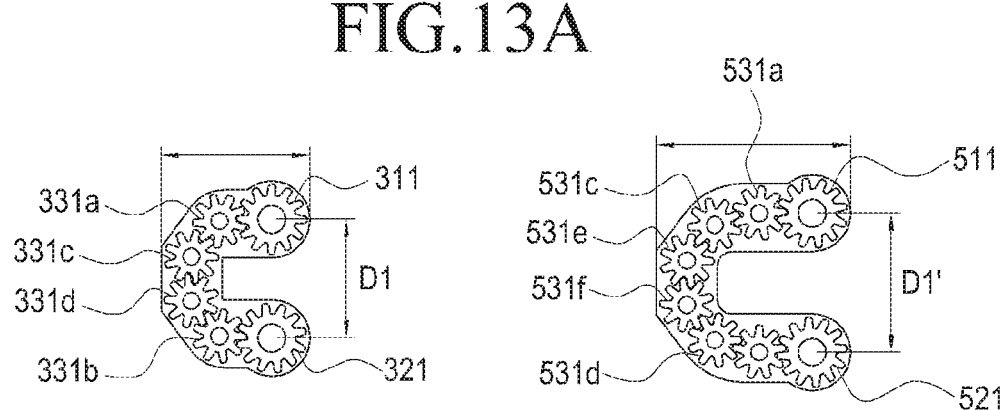

FIGS. 13A to 13C are cross-sectional views each illustrating the hinge structure 300 in the electronic device 10 of FIGS. 3A and 3B in the first operation, according to an embodiment of the present disclosure.

In FIGS. 13A to 13C, FIG. 13B illustrates an arrangement relationship of a first gear 311, a second gear 321, and four link gears 331a, 331b, 331c and 331d. FIG. 13C illustrates an arrangement relationship of a first gear 511, a second gear 521, and six link gears 531a, 531b, 531c, 531d, 531e and 531f.

According to an embodiment of the present disclosure, the first gears 311, 511 and the second gears 321,521 may be configured to have the same diameter as each other, and to have the same number of the gear teeth. The diameters of the first gears 311, 511 and the second gears 321, 521 shall not be greater than the thickness "D2" of the first housing 100 or the second housing 200, and may increase in proportion to the entire thickness "D3" of the first housing 100 and the second housing 200.

Referring to FIG. 13B, the number of link gears 331 may be an even number. For example, the link gears 331 may include a first link gear 331a, a second link gear 331b, a third link gear 331c, and a fourth link gear 331d, which are rotatable when engaged with each other.

According to another embodiment of FIG. 13C, the link gears 531 may include a first link gear 531a, a second link gear 531b, a third link gear 531c, a fourth link gear 531d, a fifth link gear 531e, and a sixth link gear 531f, which are rotatable when engaged with each other. However, the number of link gears is not limited to four or six, and may be increased in an even-numbered order.

According to an embodiment of the present disclosure, the distance D1 between the center of the first gears 311 and 511 and the center of the second gears 321 and 521 may be increased as the number of the link gears 331 and 531 increases. For example, the distance D1' in FIG. 12C may be relatively larger than the distance D1 in FIG. 12B. As still another example, the number of link gears may be increased in proportion to the distances D1 and Dr between the center of the first gears 311, 511 and the center of the second gears 321, 521, and the sizes of the first and second gears.

According to an embodiment of the present disclosure, the first link gear 531a is rotatable when engaged with the first gear 511, and may be rotated in a direction that is different from that of the first gear 511. The second link gear 531b is rotatable when engaged with the second gear 521, and may be rotated in a direction that is different from that of the second gear 521. The first link gear 531a and the second link gear 531b may have the same diameter, and may be disposed to face each other. The third link gear 531c is rotatable when engaged with the first link gear 531a, and may be rotated in the same direction as the first gear 511 or the second link gear 531b. The fourth link gear 531d is rotatable when engaged with the second link gear 531b, and may be rotated in the same direction as the second gear 521 or the first link gear 531a. The third link gear 531c and the fourth link gear 531d may have the same diameter, and may be disposed to face each other. The fifth link gear 531e is rotatable when engaged with the third link gear 531c, and may be rotated in the same direction as the second gear 521, the first link gear 531a, or the fourth link gear 531d. The sixth link gear 531*f* is rotatable when engaged with the fourth link gear 531*d*, and may be rotated in the same direction as the first gear 511, the second link gear 531*b*, or the third link gear 531*c*. The fifth link gear 531*e* and the sixth link gear 531*f* may have the same diameter, and may be disposed to face each other. Therefore, the first link gear 531*a*, the third link gear 531*c*, the fifth link gear 531*e*, the sixth link gear 531*f*, the fourth link gear 531*d*, the second link gear 531*b*, and the second gear 521 may be arranged to be rotated by being sequentially engaged with each other with reference to the first gear 511.

According to an embodiment of the present disclosure, the plurality of link gears 531*a*, 531*b*, 531*c*, 531*d*, 531*e* and 531*f* may have a relatively smaller diameter than the first gear 511 and the second gear 521. The plurality of link gears 531*a*, 531*b*, 531*c*, 531*d*, 531*e* and 531*f* may have a same diameter.

Some of the plurality of link gears 531*a*, 531*b*, 531*c*, 531*d*, 531*e* and 531*f* may also be arranged such that the centers thereof are paired on the same line. For example, the centers of the first link gear 531*a* and the second link gear 531*b* may be arranged on the same line, and the centers of the third link gear 531*c* and the fourth link gear 531*d* may be arranged on the same line. In addition, the centers of the fifth link gear 531*e* and the sixth link gear 531*f* may be arranged on the same line.

According to an embodiment of the present disclosure, an electronic device may include a first housing including a first surface and a second surface that faces in a direction opposite to the first surface, a second housing including a third surface that is capable of facing the first surface and a fourth surface that faces in a direction opposite to the third surface, and a hinge structure that is disposed in a state of being at least partially inserted into a first recess open on the first surface and a second recess open on the third surface, and couples the first housing and the second housing to be rotatable in relation to each other.

According to an embodiment of the present disclosure, the first housing includes a display device exposed to the first surface, and the second housing includes an input device exposed to the third surface.

According to an embodiment of the present disclosure, the second surface forms an outer surface of the first housing and the fourth surface forms an outer surface of the second housing, and the hinge structure may be disposed on the first surface and the third surface so as not to be exposed to the second surface and the fourth surface.

According to an embodiment of the present disclosure, the hinge structure includes a first gear that rotates in a state of being seated in the first recess of the first housing, a second gear that rotates in a direction different from a rotating direction of the first gear in a state of being seated in the second recess of the second housing, and one or more link gears that are disposed on the first surface direction of the first housing or the second surface direction of the second housing and are rotatable when engaged with the first gear or the second gear.

According to an embodiment of the present disclosure, the one or more link gears may have a diameter that is smaller than the diameter of the first gear or the second gear.

According to an embodiment of the present disclosure, the first housing may have a first imaginary axis in a direction of the first gear shaft of the first gear and may rotate in relation to the second housing about the first imaginary axis, and the second housing may have a second imaginary axis in a direction of the second gear shaft of the second gear and may rotate in relation to the first housing about the second imaginary axis.

According to an embodiment of the present disclosure, a first distance between the first imaginary axis and the second imaginary axis may be longer than a second distance between centers of the link gears.

According to an embodiment of the present disclosure, the hinge structure may include a support bracket having a shape in which one side is open to correspond to an arrangement direction of the first gear, the second gear, and the one or more link gears.

According to an embodiment of the present disclosure, the support bracket may include a first support bracket that covers the front portion of the first gear, the second gear, and the link gears, and a second support bracket that covers the rear portion of the first gear, the second gear, the link gears, and the first bracket and the second bracket may include grooves of which one side is open, and edge portions of the first housing and the second housing may be inserted into the grooves, respectively.

According to an embodiment of the present disclosure, the support bracket includes a plurality of first holes through which the first gear shaft and the second gear shaft pass, and at least one second hole disposed between the plurality of first holes, in which a link gear shaft, which supports the at least one link gear, passes through the second hole.

According to an embodiment of the present disclosure, the link gears may include a first link gear that is rotatable when engaged with the first gear and has a diameter smaller than the diameter of the first gear, a second link gear that is rotatable when engaged with the second gear and has a diameter that is equal to that of the first link gear, the second link gear being disposed to face the first link gear, a third link gear that is rotatable when engaged with the first link gear and is accommodated in or released from the first recess of the first housing according to the rotation, and a fourth link gear that is rotatable when engaged with the second link gear and the third link gear and is accommodated in or released from the second recess of the second housing according to the rotation.

According to an embodiment of the present disclosure, the centers of the first gear shaft and the second gear shaft may be arranged on the same line.

According to an embodiment of the present disclosure, the centers of the first link gear shaft, which supports the first link gear and the second link gear shaft, which supports the second link gear, are arranged on the same line, and the centers of the third link gear shaft, which supports the third link gear, and the fourth link gear shaft, which supports the fourth link gear, are arranged on the same line.

According to an embodiment of the present disclosure, in the electronic device, the first housing includes a first side portion and a second side portion that are disposed opposite to each other with reference to a center of an edge portion thereof, the second housing includes a third side portion and a fourth side portion that are disposed opposite to each other with reference to a center of an edge portion of the second housing, and the hinge structure includes a first hinge structure connected to the first side portion and the third side portion, and a second hinge structure connected to the second side portion and the fourth side portion.

According to an embodiment of the present disclosure, the electronic device further includes a hinge cover that is disposed to enclose an outer surface of the one or more link gears disposed in the first housing and the second housing, and rotates in response to the rotation of the one or more link gears.

According to an embodiment of the present disclosure, the hinge cover includes a first hinge cover that is disposed to enclose the outer surface of the one or more link gears of the first hinge structure, and a second hinge cover that is disposed to enclose the outer surface of the one or more link gears of the second hinge structure.

A hinge structure according to an embodiment of the present disclosure includes a first gear that rotates in a state of being seated in the first recess of the first housing, a second gear that rotates in a direction different from a rotating direction of the first gear in a state of being seated in the second recess of the second housing, and a plurality of link gears that are rotatable when engaged with the first gear or the second gear, and are accommodated in or released from the first recess or the second recess according to the rotation.

According to an embodiment of the present disclosure, the link gears include plural pairs of link gears, in which the centers of each pair of link gears may be disposed on the same line and may have different rotating directions.

According to an embodiment of the present disclosure, in the state where the first housing and the second housing are disposed to face each other, the link gears of the hinge structure may disposed to be accommodated in the first recess and the second recess to be invisible from the outside of the first housing and the second housing.

According to an embodiment of the present disclosure, in the state where the first housing and the second housing are disposed in parallel with each other, the link gears of the hinge structure may disposed to face the front direction of the first housing and the second housing to the upper side of the first recess and the second recess to be invisible from the rear sides of the first housing and the second housing.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first housing including a first surface and a second surface that facing in a direction opposite and perpendicular to the first surface;
   a second housing including a third surface that is capable of facing the first surface and a fourth surface that faces in a direction opposite and perpendicular to the third surface; and
   a hinge structure at least partially inserted into a first recess open on the first surface and a second recess open on the third surface, and couples the first housing and the second housing to be rotatable in relation to each other,
   wherein, when the first housing and the second housing are disposed to face each other, the hinge structure is covered by the second surface and the fourth surface and is prevented from being exposed to the outside, and
   wherein, when the first housing and the second housing are arranged in parallel with each other, the first surface and the third surface are configured to be arranged to be coplanar, and at least a portion of the hinge structure is configured to protrude from the first recess and the second recess.

2. The electronic device of claim 1, wherein the hinge structure includes:
   a first gear that rotates in the first recess of the first housing;
   a second gear that rotates in a direction different from the first gear, in the second recess of the second housing; and
   one or more link gears that are disposed on the first housing or the second housing and are rotatable when engaged with the first gear or the second gear.

3. The electronic device of claim 1, wherein the first housing includes a display device exposed to the first surface and the second housing includes an input device exposed to the third surface.

4. The electronic device of claim 1, wherein the second surface forms an outer surface of the first housing and the fourth surface forms an outer surface of the second housing, and
   wherein the hinge structure is disposed inside the first surface and the third surface and is not exposed to the second surface and the fourth surface.

5. The electronic device of claim 2, wherein the one or more link gears have a diameter that is smaller than a diameter of the first gear or the second gear.

6. The electronic device of claim 2, wherein the first housing has a first imaginary axis in a direction of the first gear shaft of the first gear and rotates in relation to the second housing about the first imaginary axis, and
   wherein the second housing has a second imaginary axis in a direction of the second gear shaft of the second gear and rotates in relation to the first housing about the second imaginary axis.

7. The electronic device of claim 6, wherein a first distance between the first imaginary axis and the second imaginary axis is longer than a second distance between centers of adjacent link gears.

8. The electronic device of claim 2, wherein the hinge structure includes:
   a support bracket having a shape in which one side is open to correspond to an arrangement direction of the first gear, the second gear, and the one or more link gears.

9. The electronic device of claim 8, wherein the support bracket includes:
   a first support bracket that covers one side of the first gear, the second gear, and the one or more link gears, and a second support bracket that covers the other side of the first gear, the second gear, and the one or more link gears, and
   wherein the first bracket and the second bracket include grooves of which one side is open, and
   wherein, when the first surface of the first housing and the third surface of the second housing are arranged in the same direction, edge portions of the first housing and the second housing are inserted into the grooves, respectively.

10. The electronic device of claim 9, wherein the support bracket includes:
    a plurality of first holes configured to allow a first gear shaft and a second gear shaft to pass through; and
    at least one second hole disposed between the plurality of first holes, and configured to allow a link gear shaft to pass through so as to support the one or more link gears.

11. The electronic device of claim 2, wherein the one or more link gears include:
    a first link gear that is rotatable when engaged with the first gear and has a diameter smaller than the diameter of the first gear;

a second link gear that is rotatable when engaged with the second gear and has a diameter that is equal to that of the first link gear, the second link gear being disposed to face the first link gear;

a third link gear that is rotatable when engaged with the first link gear and is accommodated in or away from the first recess of the first housing according to a rotation direction; and a fourth link gear that is rotatable when engaged with the second link gear and the third link gear and is accommodated in or away from the second recess of the second housing according to the rotation direction.

12. The electronic device of claim 11, wherein centers of a first gear shaft of the first gear and a second gear shaft of the second gear are arranged on a same line.

13. The electronic device of claim 12, wherein centers of a first link gear shaft, which supports the first link gear, and a second link gear shaft, which supports the second link gear, are disposed on a same line, and wherein centers of the third link gear shaft, which supports the third link gear and the fourth link gear shaft, which supports the fourth link gear, are arranged on a same line.

14. The electronic device of claim 2, wherein the first housing includes a first side portion and a second side portion that are disposed opposite to each other with reference to a center of an edge portion of the first housing;

the second housing includes a third side portion and a fourth side portion that are disposed opposite to each other with reference to a center of an edge portion of the second housing; and the hinge structure includes a first hinge structure connected to the first side portion and the third side portion, and a second hinge structure connected to the second side portion and the fourth side portion.

15. The electronic device of claim 14, further comprising:

a hinge cover that is disposed to enclose an outer surface of the one or more link gears disposed in the first housing and the second housing, and rotates in response to the rotation of the one or more link gears.

16. The electronic device of claim 15, wherein the hinge cover includes:

a first hinge cover that is disposed to enclose the outer surface of the one or more link gears of the first hinge structure; and a second hinge cover that is disposed to enclose the outer surface of the one or more link gears of the second hinge structure.

17. A hinge structure comprising:

a first gear that rotates in a first recess disposed on one surface of a first housing;

a second gear that rotates in a direction different from a rotating direction of the first gear, in a second recess disposed on one surface of a second housing; and a plurality of link gears that are rotatable when engaged with the first gear or the second gear, and are accommodated in or away from the first recess or the second recess according to the rotation direction, wherein, when the first housing and the second housing are disposed to face each other, the first gear, the second gear and the plurality of link gears of the hinge structure are disposed in the first recess and the second recess to be invisible from the outside of the first housing and the second housing, and wherein, when the first housing and the second housing are arranged in parallel with each other, the first surface and the third surface are configured to be arranged to be coplanar, and the plurality of link gears of the hinge structure are configured to protrude from the first recess and the second recess.

18. The hinge structure of claim 17, wherein the plurality of link gears include at least one pair of link gears, and centers of the at least one pair of link gears are arranged on a same line to be rotated in different directions.

19. The hinge structure of claim 17, wherein, when the first housing and the second housing are arranged in parallel with each other, the plurality of link gears of the hinge structure are disposed to front surfaces of the first housing and the second housing so that the plurality of link gears are invisible from the rear surfaces of the first housing and the second housing.

* * * * *